United States Patent [19]
Kanayama et al.

[11] 3,784,298
[45] Jan. 8, 1974

[54] ROLL DUPLICATOR

[75] Inventors: Mitsutoshi Kanayama; Takao Toda, both of Tokyo, Japan

[73] Assignee: Canon Kabushiki Kaisha, Tokyo, Japan

[22] Filed: Feb. 27, 1973

[21] Appl. No.: 336,379

[30] Foreign Application Priority Data
Mar. 3, 1972 Japan.............................. 47/26402

[52] U.S. Cl............................... 355/109, 355/112
[51] Int. Cl............................................ G03b 27/12
[58] Field of Search...................... 355/48, 50, 102, 355/109, 112

[56] References Cited
UNITED STATES PATENTS
2,600,470  6/1952  Breurers ............................. 355/109
3,091,169  5/1963  Taini.................................... 355/109
3,230,857  1/1966  Ritzerfeld .......................... 355/109

Primary Examiner—John M. Horan
Attorney—Joseph M. Fitzpatrick et al.

[57] ABSTRACT

An improved roll duplicator is employed to continuously produce a predetermined number of copies from an endless original film by means of counting the number of an output signal of a photo-senser by a counter. The photosenser for generating the output signal in response to the reception of the light reflected back from a mark on the endless original film comprises a photo-electric cell having a large light intercepting surface. The counter has a plurality of first contacts and a movable contact which is stepped in response to an output signal from the photosenser. A presetting device comprises a switch having a plurality of second contacts each corresponding to each the plurality of first contacts. The transport of the endless original film and copy film is interrupted when the movable contact makes into contact with one of the first contacts corresponding to one of the second contacts which has been preset.

5 Claims, 3 Drawing Figures

ROLL DUPLICATOR

BACKGROUND OF THE INVENTION

1. Field of the Invention

The present invention relates to generally a device for producing copies from an original film and more particularly a roll duplicator for continuously producing a large number of copies from an original film.

2. Description of the Prior Art

A large number of copies of an original microfilm may be produced at less cost by contact exposure or printing in a simple manner. Copies of an original microfilm are required when the copies must be distributed, when the original microfilm is used very often so that it is easily susceptible to damage or scratch or when an original microfilm having the important data recorded thereupon must be stored in a safeguarded place in order to prevent it from being destroyed by fire or the like. It is when a large number of copies are printed and distributed for various uses that the advantages of the microfilming technique are fully taken.

In general in order to produce a large number of copies from an original film the latter is joined at the ends to form an endless film so that it may be continuously transported and made in contact with an unexposed film for printing. However an operator must watch the printing operation until a desired number of copies are produced. To overcome this problem there has been proposed a method in which a suitable mark attached to an endless original film is detected whenever one copy is produced so as to give the signal representing the number of copies produced. In one prior art roll duplicator a mark is attached on a suitable position of a diazo microfilm or microfilm sold under the trademark of "Kafax or Kalver" transported by a capstan, pinch roller and guide rollers so that the light beam emitted from a light source is reflected back by the mark to impinge upon a photoelectric cell or the like. The output signals of the photoelectric cell are counted by a conventional transistorized counter for counting the number of copies produced. However, when the film being transported is deflected or slacked due to the variation in film transporting speed, the light beam reflected back from the mark is intermittently intercepted by the photoelectric cell so that the counter counts the same signal many times. As a result the number of copies produced is miscounted, and in some cases undesired copies are produced.

SUMMARY OF THE INVENTION

One of the objects of the present invention is therefore to overcome the above defects encountered in the prior art roll duplicators.

Another object of the present invention is to provide a roll duplicator of the type in which an endless original microfilm loop is continuously transported so that a plurality of prints or copies may be reproduced.

Another object of the present invention is to provide a roll duplicator of the type automatically producing a desired number of copies or prints.

Another object of the present invention is to provide a roll duplicator of the type incorporating a counter capable of correctly counting a number of copies or prints of an original microfilm produced.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
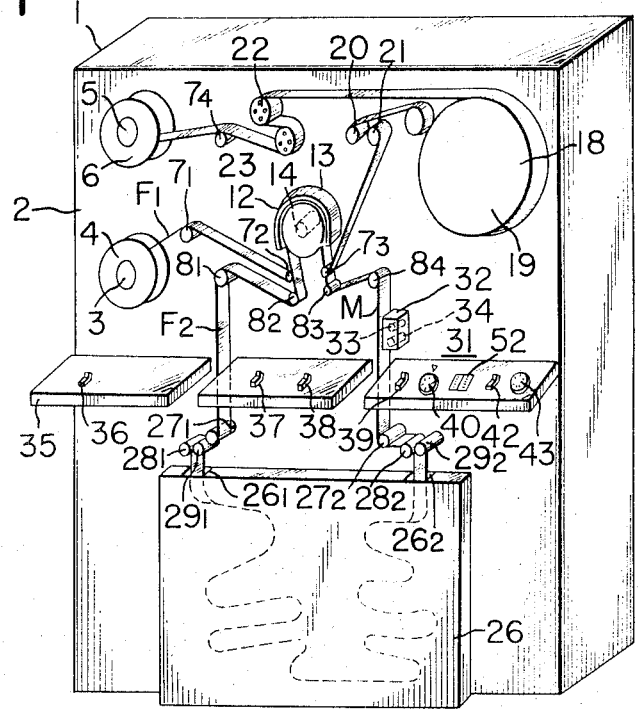
FIG. 1 is a perspective view of a roll duplicator in accordance with the present invention.

A roll duplicator shown in FIG. 1 comprises a housing 1 having a panel 2 upon which is formed a film threading path for unexposed copying film F1 such as a diazo film or Kalfax microfilm extending from a feed reel 4 carried by a feed reel spindle 3 through guide rollers $7_1$ and $7_2$, an exposure device 12, a guide roller $7_3$, a pinch roller 21, a capstan 20, a developer 18, a pair of cooling rollers 22 and 23 to a take-up reel carried by a take-up reel shaft 5. The feed-reel shaft 3 is imparted with a suitable frictional force by means of a friction mechanism (not shown) and the take-up reel spindle 5 is driven by an electric motor (not shown) disposed within the housing 1. The capstan 20 is also driven by an electric motor (not shown) disposed within the housing 1, and the pinch roller 21 is adapted to move toward the capstan 20 so as to press the film F1 against it or move away from it.

A loop box 25 whose inside wall 26 is lined with Teflon (trademark) in order to prevent the original film F2 from being scratched or damaged is installed on the lower portion of the panel 2. A film threading path for the endless original microfilm F2 is provided extending from the loop box 25 through an opening $26_1$, a pair of feed rollers $28_1$ and $29_1$, an idler or guide roller $27_1$, guide rollers $8_1$ and $8_2$, the exposure device 12, guide rollers $8_3$ and $8_4$, and idler or guide roller $27_2$, another pair of feed rollers $28_2$ and $29_2$ and an opening $26_2$ back to the loop box 25 again. The pair of feed rollers $28_1$ and $29_1$ are driven in the opposite directions by individual torque motors so that the endless original film F2 may be applied with a predetermined tension when it is stopped, that is when no printing operation is carried out.

The exposure device 12 which is surrounded by a semicylindrical shielding plate 13 comprises a transparent heat-resisting glass cylinder (not shown) around which are wound the original film F2 and the unexposed copy film F1 for contact exposure, an aperture control cylinder (not shown) adapted to adjust the aperture or slit and a light source 14 disposed within the aperture control cylinder.

The developer 18 for effecting the thermal development of the copy film exposed in the exposure device 12 comprises a heating drum 19 having a heater (not shown) therein. The copy film F1 is developed as it travels along the periphery of the heating drum 19, which is driven by the electric motor for driving the capstan 20.

The pair of cooling rollers 22 and 23 comprise hollow cylinders each having a plurality of holes formed through a side wall thereof. A blower (not shown) is disposed within the housing 1 so that the air is sucked through the holes into the cooling rollers 22 and 23, thereby increasing the efficiency in cooling the developed film F1 wrapped therearound.

At the joint of the endless original film F2 is bonded with a suitable adhesive agent a rectangular mark M made of a highly reflective material such as silver film or the like. Along the path of the original film F2 between the guide rollers $8_4$ and $27_2$ is disposed a detector generally indicated by 31 for detecting the mark M on the original film F2. The detector 31 comprises a housing 32 which is opened toward the path of the endless original film F2, a light source or lamp 33 and a photoelectric cell 34 such as a phototransistor, a photodiode or the like for intercepting the light beam from the lamp 33 reflected back by the mark M on the endless original film F2.

On a control panel 35 horizontally extending from the panel 2 are disposed an ON-OFF switch 36, two pairs of motor control switches 37 and 38, 39 and 42, a dial 40 for setting a number of printings to be made from the same original film, a speed control dial 41 and an indicator 52 for indicating a number of printings made. When the ON-OFF switch is closed the current is supplied to the electric circuit in the housing and the blower is driven. When the switches 37 and 38 are closed the driving roller $29_1$ is rotated in the counterclockwise direction whereas the driving roller $28_2$ is rotated in the clockwise direction. Since the torques of the driving motors coupled to the driving rollers $29_1$ and $28_2$ are equal the original film F2 is held stationary under a predetermined tension between the driving rollers $29_1$ and $28_2$. After thr printing number setting dial 40 and the speed control 41 have been set, the switches 39 and 42 are closed the capstan roller 20, the heating drum 19, the take-up reel 6 are rotated at a preset speed so that the films F1 and F2 are transported at the same speed. In this case the detector 31 is energized so that the lamp 33 is turned on. The printing operation is started and everytime when the original film F2 is copied the indicator 52 is stepped by one as the mark M on the original film F2 is detected by the detector 31 as will be described in more detail hereinafter.

Next referring to FIG. 2 the detector 31 for detecting the mark M on the original film F2 will be described in detail. The light beam from the lamp 33 which is reflected back from the mark M on the original film F2 impinges on the photoelectric element 34 in a photosensor 49. It is preferable to use the photoelectric cell 34 having a relatively wide light intercepting area so that it may output the signal only when the light beam reflected back by the mark M is received all over the surface of the photoelectric element in order to prevent the erratic operation of the detector due to the reflected light beam which is intermittently intercepted by a part of the light receiving surface of the photoelectric element 34 because of the slacking and deflection of the original film F2. This erratic operation would lead to miscounting of printings. The detector is coupled through an amplifier 50 to a counter stage or circuit 51 comprising a counter $51_1$ for counting the units digit, a counter $51_2$ for counting the tens digit and so on. The counter circuit 51 is connected to a display stage 52 comprising a display $52_1$ for displaying the units digit, a display $52_2$ for displaying the tens digit, and so on. A number of desired printings is preset into a setter 53 by the preset dial 40 on the control panel 35 and is compared by a coincidence circuit 54 with the content of the counter circuit 51 so that the when the content of the setting circuit 53 coincides with that of the counter circuit 51 the coincidence circuit 54 outputs the coincidence signal to feeder 55 so as to stop the driving motor for the capstan 20. The coincidence signal is also applied to a resetter 57 for resetting the counter circuit 51 and also to an alarm 56 such as a buzzer for giving the signal that the printing operation has been completed.

Figure 3:
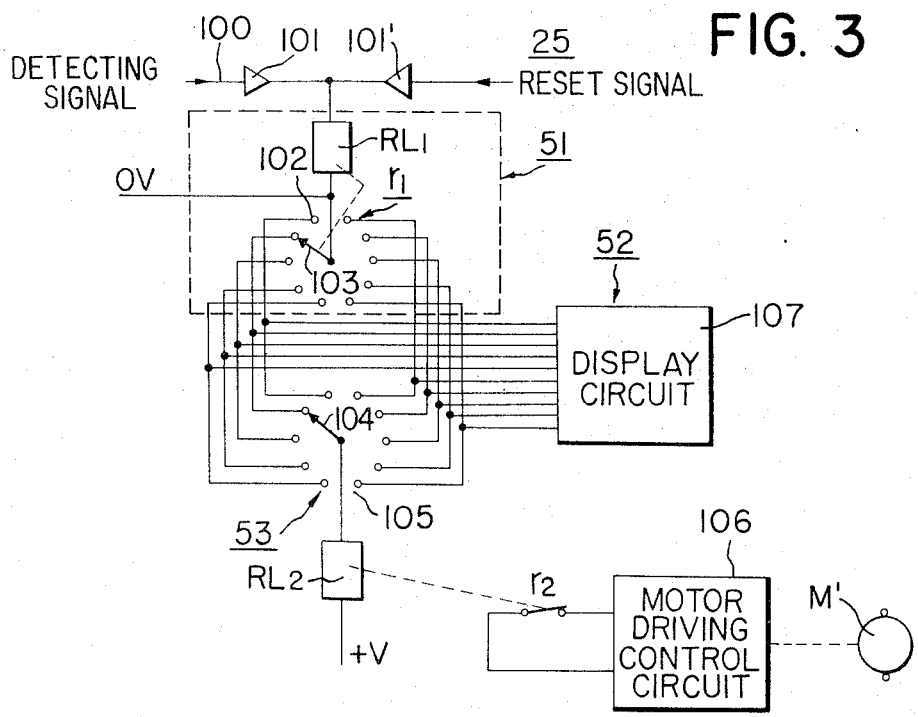
FIG. 3 is a circuit diagram thereof.
Figure 2:
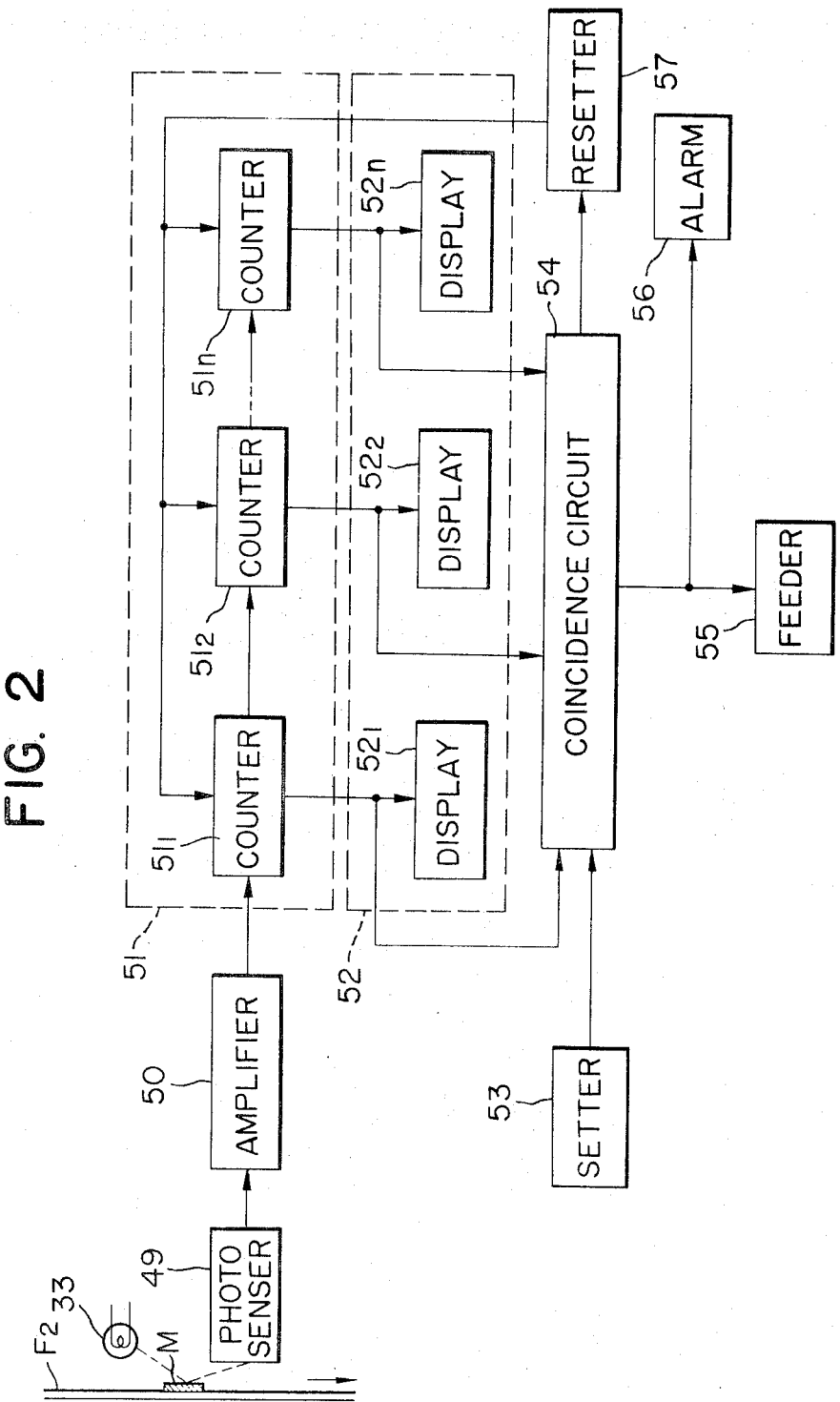
FIG. 2 is a block diagram of a detector for counting a number of copies or prints produced and its associated component parts.

The circuits shown in block diagram in FIG. 2 is illustrated in detail in FIG. 3. The output signal of the photoelectric cell 34 is fed through a signal line 100 and a diode 101 to the counter stage or circuit 51 having a rotary stepping relay RL1 of the type in which a movable contact element or arm steps in response to the output signal. A rotary switch r1 in the rotary stepping relay RL1 comprises a plurality of fixed contacts 102 and a movable contact 103 which is rotated in the counterclockwise direction in response to the actuation of the relay RL1 to contact with one of the fixed contacts 102. In the instant embodiment the rotary switch r1 is shown as having ten fixed contacts 102, and the movable contact 103 is in contact with the fixed contact "0" (not shown) and is maintained at 0 volt. A plurality of rotary switches r1 may be provided in order to indicate the digit of a number to be counted.

The setter 53 comprises a movable contact 104 coupled to the setting dial 40 and a plurality of stationary contacts 105. The stationary contacts 105 are electrically connected to the corresponding contacts 102 of the rotary switch r1. The movable contact 104 is connected to the power source +V through a relay RL2 whose normally closed contact r2 is inserted in a control circuit 106 for controlling the driving motor M for the capstan 20. When the relay RL2 is energized the normally closed contact r2 is opened so as to de-energize the control circuit 106 thereby stopping the driving motor M.

The display stage 52 comprises a display circuit 107 connected to the stationary contacts 102 of the rotary switch r1 so that the stationary contact 102 is closed by the movable contact 103 may be displayed or indicated.

Next the mode of operation for printing four copies F1 from the endless original film F2 will be described. The setting dial 40 is set to "4" so that the movable contact 104 coupled to the dial 40 may be made into contact with the stationary contact 105 as shown in FIG. 3. The movable contact 103 of the rotary switch r1 is made into contact with the stationary contact 102 representing "0." The switches and the speed control dial on the control panel 35 are set in the manner described hereinbefore. The relay RL2 is not energized so that the driving motor M' is energized so as to drive the capstan 20, thereby transporting both the films F1 and F2 at the same speed. As the endless original film F2 is transported so that the mark M thereupon pass through the detector 31, the light emitted from the lamp 33 and reflected back by the mark M impinges upon the photoelectric element 34 so that the relay RL1 is energized in response to the output signal of the element 34. Then the movable arm 103 of the relay RL1 is rotated in the counterclockwise direction by one step and made into contact with the next stationary contact 102 representing "1" so that the indicator 52 indicates "1." When the mark M has been detected four times amd the movable contact 103 of the rotary switch r1 has been made into contact with the stationary contact 102 as shown in FIG. 3 which is connected to the stationary contact 105 closed by the movable contact 104 of the setting circuit 53, the electric circuit leading from the power source +V through the movable contact 104, the stationary contacts 105 and 102 both representing "4" to the movable contact 103 so that the relay RL2 is energized. As a result the normally closed contact r 2 of the relay RL2 is opened so that the motor driving control circuit 106 is de-energized and the driving motor M' is stopped. Therefore the transport of the films F1 and F2 is interrupted and the printing operation is stopped automatically after four copies are made from the original film F2.

There may be provided a buzzer or the like which may be actuated in response to the energization of the relay RL2 so as to give the alarm signal to the operator.

After a predetermined number of copies have been reproduced, the reset signal consisting of a pulse train is applied through a diode 101' to the counter circuit 51 so that the movable contact 103 of the rotary switch r1 may be returned to its initial position "0."

As described hereinbefore according to the present invention utilizes a mechanical counter with a relatively long response time without using a transistorized counter having a quick response time and sensitivity so that the miscounting due to the deflection or slack of the film may be prevented and the roll duplicator simple in construction and inexpensive to manufacture may be provided. Furthermore the counting may be carried out in a reliable manner without being adversely affected by the noise due to the great power consumption of the roll duplicator.

So far the present invention has been described as being applied to a dry processing type printer using dizo film or the like, but it is to be understood that the present invention may be also applied to a wet type printer of the type using silver halide film.

We claim:

1. A roll duplicator in which an unexposed rolled copy film and an endless original film are continuously transported so as to print the images on said original film upon said copy film CHARACTERIZED BY comprising
   a. means for transporting said endless original film and said unexposed rolled copy film to an exposure device,
   b. means disposed adjacent to the path of said endless original film for illuminating a mark upon said endless original film,
   c. photoelectric means for giving the output signal in response to the interception of the light reflected back from said mark on said endless original film,
   d. means for counting the number of said output signals from said photoelectric means, said counting means having a plurality of first contacts and a movable contact which is stepped or shifted in response to said output signal of said photoelectric means so as to contact with one of said plurality of first contacts,
   e. means for presetting a number of said output signals to be counted, said presetting means comprising switching means having a plurality of second contacts equal in number to said plurality of first contacts and means for applying a voltage to one of said plurality of second contacts which are electrically connected to the corresponding first contacts, and
   f. means for interrupting the transport of said endless original film and said copy film by said transporting means when said movable contact makes into contact with one of said first contacts corresponding to one of said second contacts which is energized by said voltage application means.

2. A roll duplicator as defined in claim 1 wherein said photoelectric means comprises a photoelectric cell having a large light intercepting surface.

3. A roll duplicator as defined in claim 1 wherein said switching means comprises a plurality of stationary contacts and a movable contact engageable with one of said plurality of stationary contacts and electrically connected to said voltage application means.

4. A roll duplicator as defined in claim 1 wherein said counter means comprises a plurality of stationary contacts and a movable contact which is stepped in response to said output signal of said photoelectric means os so as to contact with one of said plurality of stationary contacts sequentially.

5. A roll duplicator as defined in claim 3 wherein said counter means further comprises means for indicating the number counted by said counter means, and said movable contact of said switching means is manually operated.

* * * * *